United States Patent [19]
Nakatani

[11] Patent Number: 5,832,814
[45] Date of Patent: Nov. 10, 1998

[54] CONTROLLER FOR AUTOMATIC COOKING MACHINE

[75] Inventor: Tomoyoshi Nakatani, Mie, Japan

[73] Assignee: Fuji Electric Co., Ltd., Kawasaki, Japan

[21] Appl. No.: 749,178

[22] Filed: Nov. 14, 1996

[30] Foreign Application Priority Data

Nov. 14, 1995 [JP] Japan .................................. 7-319712

[51] Int. Cl.⁶ ............................ A21C 9/00; A21C 11/00; A23P 1/00
[52] U.S. Cl. ............................ 99/450.6; 99/325; 99/353; 99/450.1; 99/450.7; 99/486
[58] Field of Search ...................... 99/353–355, 325–335, 99/486–489, 450.1–450.8, 494, 357; 426/92, 94, 297, 502; 425/376.1, 112, 511, 515, 96; 53/210, 465; 141/158, 168

[56] References Cited

U.S. PATENT DOCUMENTS

| | | | |
|---|---|---|---|
| 3,669,007 | 6/1972 | Pulici | 99/450.6 |
| 3,757,676 | 9/1973 | Pomara, Jr. | 99/450.7 |
| 3,782,272 | 1/1974 | Cooper | 99/450.7 |
| 3,901,137 | 8/1975 | Jimenez | 99/353 |
| 4,084,493 | 4/1978 | Quintana | 426/297 X |
| 4,393,758 | 7/1983 | Anmahian | 425/511 X |
| 4,483,242 | 11/1984 | Goodman et al. | 53/210 X |
| 4,516,487 | 5/1985 | Madison et al. | 99/450.6 |
| 4,608,919 | 9/1986 | Prows et al. | 99/450.6 |
| 4,638,729 | 1/1987 | Woodworth et al. | 99/450.6 |
| 4,691,627 | 9/1987 | Roberts | 99/450.2 X |
| 5,012,726 | 5/1991 | Fehr et al. | 99/494 X |
| 5,263,407 | 11/1993 | Pomara, Jr. | 99/450.6 |

*Primary Examiner*—Timothy F. Simone
*Attorney, Agent, or Firm*—Kanesaka & Takeuchi

[57] ABSTRACT

An automatic cooking machine is formed of housing and loading mechanisms for various food materials positioned at a specified interval, a transfer mechanism for transferring the food materials at the food material loading positions, and a control device for controlling the housing and loading mechanism and the transfer mechanism. In the machine, the foods are continuously prepared by repeating cycles, each including one transfer of a food material from one to subsequent food material loading positions and loading of the food material from one of the housing and loading mechanisms. In the control device, when a temporary stop instruction is input, the food manufacturing operation is not immediately stopped but stopped after the current cycle has finished in order to enable the operation to be resumed from the subsequent cycle using a temporary stop cancel instruction. Therefore, a preparation of food, such as tacos, can be temporarily stopped when a defect occurs, and can be resumed after the defect has been eliminated.

7 Claims, 4 Drawing Sheets

Fig. 4

| 1 | Item code data for the tortilla loading position |
|---|---|
| 2 | Item code data for the taco-shell loading position |
| 3 | Item code data for the meat loading position |
| 4 | Item code data for the wild-sauce loading position |
| 5 | Item code data for the sour cream and lettuce loading position |
| 6 | Item code data for the cheese loading position |
| 7 | Item code data for the tomato loading position |
| 8 | Item code data for the packing position |
| 9 | Item code data for the lifting position |
| A | Item code data for the sorting position |

# 5,832,814

CONTROLLER FOR AUTOMATIC COOKING MACHINE

BACKGROUND OF THE INVENTION AND RELATED ART STATEMENT

The present invention relates to an automatic cooking machine, which comprises housing and loading mechanisms for various food materials positioned at a specified interval, and a transfer mechanism for performing step transfer operations among food material loading positions of the housing and loading mechanisms. In the automatic cooking machine, foods, particularly tacos, are continuously prepared by sequentially feeding various food materials onto base food materials while repeating step transfer of foods to subsequent food material loading positions by the transfer mechanism and loading of each food material from the housing and loading mechanisms, based on cooking data input beforehand. In particular, the invention relates to an improvement of a controller that copes with defects of the machine easily.

Tacos are made by folding into two a disc-like skin formed by kneading and baking a flour and water mixture and inserting various food materials, such as minced meat, vegetables, and cheese between the folded skin. Tacos, however, have soft and hard types, as well as various kinds, depending on the type and kind of food materials included therein. In case a plurality of such tacos is prepared as one lot using an automatic cooking machine, cooking data for the food items and the number thereof are input from an input device and a start button is pressed. In this case, the preparation process can not be conventionally stopped until all the food items have been prepared.

Thus, when a housing and loading mechanism for one of the food materials becomes empty, or a transfer operation fails, or other easily correctable defects occur, the manufacturing operation or preparation process can not be temporarily stopped. No action can be taken if defective foods are found during the preparation process. Of course, means to shut down the apparatus in the event of an accident is provided, but it immediately stops the apparatus even during a food material loading cycle and clears input cooking data, thereby preventing the preparation process from being continued after the defect has been corrected. As a result, the food materials are wasted, and the process must be started again by inputting data.

It is, therefore, an object of the invention to provide an automatic cooking machine with a controller, which can temporarily stop the preparing operation of the automatic cooking machine as required and to resume the stopped operation without starting the process again from the beginning.

SUMMARY OF THE INVENTION

The invention solves the above problem by avoiding the immediate stop of the food preparing operation when a temporary stop instruction is input, and stopping the machine when the current cycle is completed. A controller for the automatic cooking machine according to the invention includes temporary stop input means to input an instruction to temporarily stop a food manufacturing or preparing operation, temporary stop means which enables the input of the temporary stop instruction to temporarily stop the food preparing operation when the current cycle or step is finished, resumption input means to input an instruction to resume the temporarily stopped food preparing operation, and temporary stop cancellation means which enables the input of the resumption instruction to resume the food preparing operation from the step subsequent to the completed step.

If the controller has sensors for detecting defects in the food material housing and loading mechanisms which require temporary stop, that is, easily correctable defects, such as shortage of food materials and failures to transfer the food materials, and the output of the sensors are used to actuate the temporary stop means, the automatic cooking machine can be automatically stopped when a defect occurs to appropriately correct the defect, such as adding a food material.

If the controller has means to display data in the temporary stop for foods stopped at the food material loading positions, this means can conveniently show the current process step for the food being prepared. In this case, if the controller also has means during temporary stop to highlight the display of food at the loading position at which a defect is occurring, the operator can quickly and conveniently recognize the food material loading position at which the defect is occurring.

If the controller has means to instruct suspension of preparation of the displayed food, the defective food can be conveniently removed. In this case, if the controller also has means to instruct resumption of preparation of the suspended food, the removed food can be rearranged immediately.

BRIEF DESCRIPTION OF THE DRAWINGS

FIG. 4 is a table showing the corresponding relationship between locational data and item code data on foods.

DETAILED DESCRIPTION OF A PREFERRED EMBODIMENT

Figure 1:
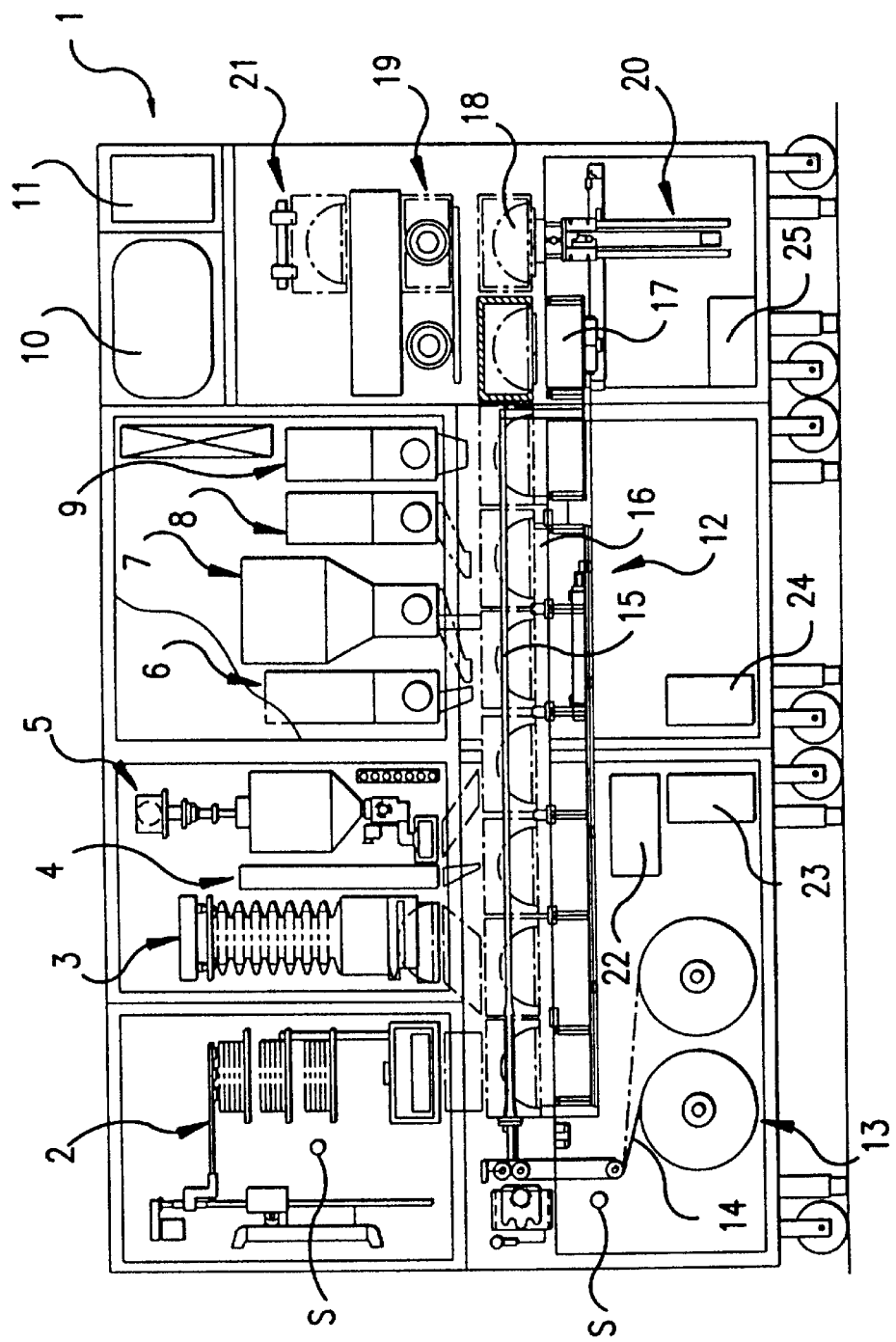
FIG. 1 is a front view showing an overall structure of an automatic cooking machine, to which the invention is applied.

An embodiment of the invention for an automatic cooking machine is described with reference to FIGS. 1 to 4. FIG. 1 is a front view showing an overall structure of an automatic taco cooking machine.

In FIG. 1, a tortilla housing and transfer mechanism 2 to discharge skins of soft tacos (called "tortillas"), a taco shell housing and loading mechanism 3 to discharge skins of hard tacos (called "taco shells"), a wild sauce housing and loading mechanism 4 to discharge wild sauce, a meat housing and loading mechanism 5 to discharge minced meat, a sour cream housing and loading mechanism 6 to discharge sour cream, a lettuce housing and loading mechanism 7 to discharge lettuce strips, a cheese housing and loading mechanism 8 to discharge cheese strips, and a tomato housing and loading mechanism 9 to discharge tomatoes cut into cubes are located in a line from left to right at a specified interval in the upper part of a box-type cabinet 1. The food material loading ends of chutes of the respective mechanisms are evenly spaced apart from each other. At the upper right end of the machine, a man-machine interface (MMI) 10 with a front screen in a touch panel display type and a master controller 11 are installed.

A transfer mechanism 12 that performs a step-transfer operation among food material loading positions is positioned horizontally below the housing and loading mechanisms 2 to 9 extending from the tortilla housing and loading mechanism 2 to the tomato housing and loading mechanism 9, and a packing paper supply mechanism 13 is installed below an input end (left end) of the transfer mechanism 12. The transfer mechanism 12 comprises a packing paper guide to place and move the packing paper 14 with the food materials thereon, the packing paper 14 being supplied by the packing paper supply mechanism 13 and cut into pieces to correspond to the size of a single food item (taco), and packing paper feed mechanisms driven by an air cylinder to move back and forth among the food material loading positions while grasping both ends of the packing paper 14. The packing paper guide comprises a packing paper guide member 15 having a pair of stainless wires positioned horizontally and in parallel, and a receiving plate 16 positioned below the packing paper guide member 15 along its center and formed of a stainless steel plate.

A packing mechanism 17 is installed adjacent to an output end (right end) of the transfer mechanism 12, and a lifting mechanism 20 driven by an air cylinder to lift a packed food 18 up to a storage mechanism 19 located above is installed adjacent to the packing mechanism 17. Furthermore, a sorting mechanism 21 to sort the lifted food 18 into soft and hard tacos is installed above the storage mechanism 19. Electrical equipment and accessories are housed below the transfer mechanism 12, and include a transfer controller 22 controlled by the master controller 11 to control each section, a soft taco controller 23, a hot food material controller 24, a cold food material controller 25, a power supply (not shown), and a cooling unit (not shown).

Figure 2:
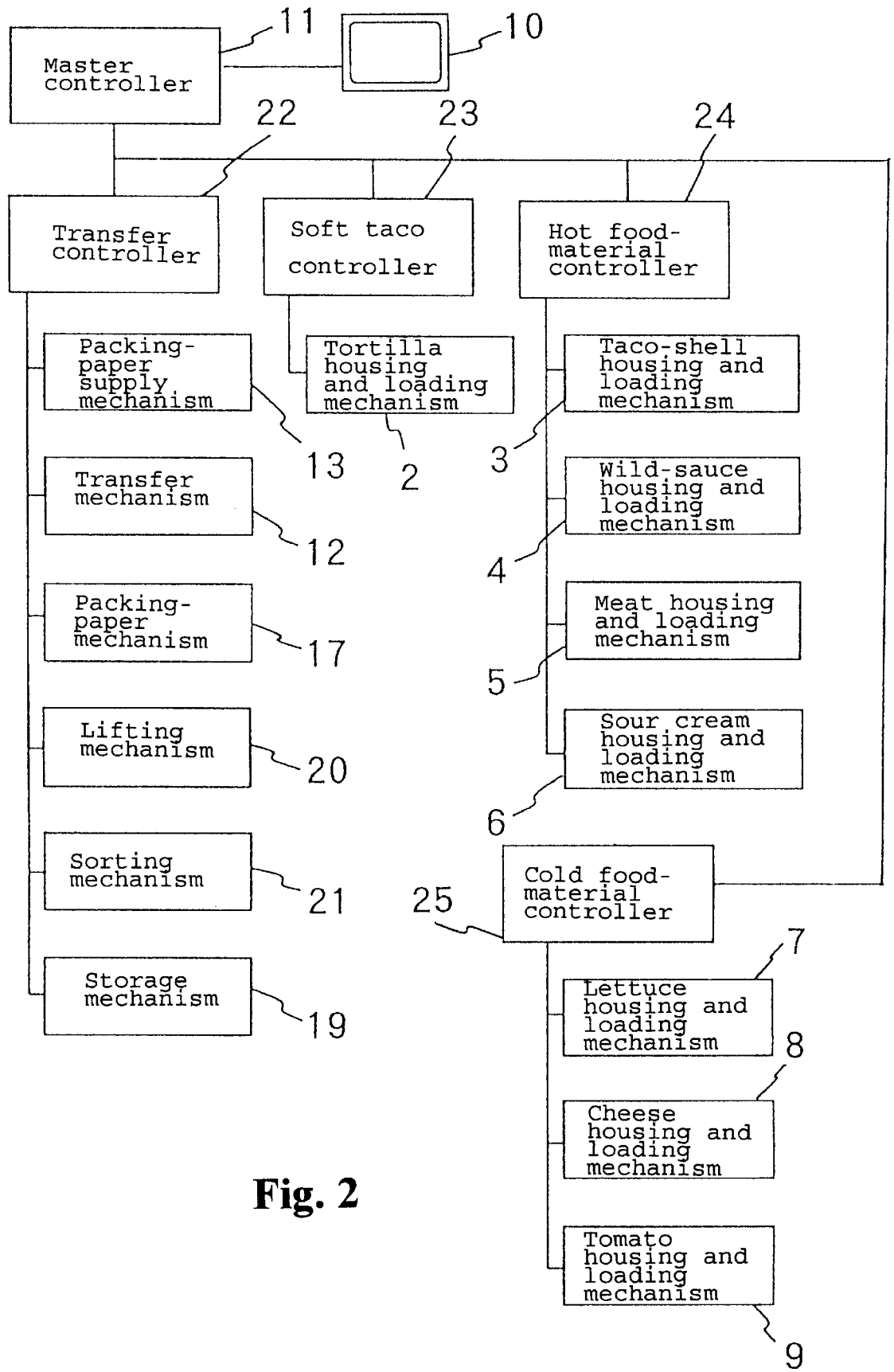
FIG. 2 is a system block diagram showing a controller for the automatic cooking machine in FIG. 1.

FIG. 2 is a system block diagram of the controller for the automatic cooking machine in FIG. 1, wherein control data (amount of each food material to be discharged and operational condition of the transfer mechanism 12) and cooking data (food items and number to be prepared) input from the screen of the MMI 10 are transmitted to each controller 22 to 25 via the master controller 11 for overall control of the automatic cooking machine. The transfer controller 22 controls the packing paper supply mechanism 13, the transfer mechanism 12, the packing mechanism 17, the lifting mechanism 20, the sorting mechanism 21 and the storage mechanism 19; the soft taco controller 23 controls the tortilla housing and loading means 2; the hot food material controller 24 controls the taco shell housing and loading mechanism 3, the wild sauce housing and loading mechanism 4, the meat housing and loading mechanism 5 and the sour cream housing and loading mechanism 6; and the cold food material controller 25 controls the lettuce housing and loading mechanism 7, the cheese housing and loading mechanism 8 and the tomato housing and loading mechanism 9.

With the above automatic cooking machine, when a manufacturing operation is initiated, the packing paper 14 drawn out from the roll of the packing paper supply mechanism 13 is cut at its end set at the loading position for a first food material, that is, a tortilla, so as to obtain a piece of paper corresponding to a size of a single food item. Then, in case of a soft taco, a tortilla is folded into two and is fed onto the cut packing paper 14 from the tortilla housing and loading mechanism 2. By the weight thereof, the packing paper 14 is folded in two along the V-shaped cross section formed by the packing paper member 15 and the receiving plate 16. In case of a hard taco, the packing paper is transferred to the subsequent taco shell loading position without loading a tortilla, and there a taco shell is fed onto the packing paper from the taco shell housing and loading mechanism 3. In the packing paper feed mechanism, both ends of the folded packing paper 14 are grasped and are moved for one step, and after releasing the packing paper 14 at this subsequent food material loading position, the mechanism returns to the original position. This process is repeated.

Whenever the step transfer of the packing paper 14 is carried out, the packing paper 14 is drawn out, a tortilla or taco shell is placed onto the packing paper 14, and various food materials, such as wild sauce and meat are sequentially added thereto according to the specified food items. Once the taco has reached the tomato loading position, the cooking process is finished and the packing mechanism 17 seals the packing paper 14 around the taco to form a final product. The food 18 finished in this manner is transferred to the lifting mechanism 20, where it is lifted up to the sorting mechanism 21. The soft taco is then dropped onto the storage mechanism 19, whereas the hard taco is moved to the left and is then dropped. In the storage mechanism 19, a storage shelf comprising a longitudinally disposed spiral wire receives the dropped food 18, and then the spiral wire is turned once to move the food 18 rearwardly in order to store it therein.

As described above, in the normal operation, the following cycle is repeated to complete a taco.

1. Data for the next food item that comes to each food material loading position are transferred from the master controller 11 to each controller 22 to 25.
2. The packing paper 14 with food materials loaded thereon is transferred step by step to the subsequent food material loading position.
3. A food material is loaded at each food-material loading position according to the food item data.

Next, the temporary stop control according to the invention is described. Sensors, such as S for packing paper, for detecting defects are located at some positions. These sensors are well known and include optical sensors, which monitor operations for failure to supply packing paper due to shortage of paper or blockage and failure to transfer food materials due to shortage of food materials.

When a temporary stop icon or button displayed on the screen of the MMI 10 is touched or the sensor detects a defect, the MMI 10 informs the master controller 11 that a temporary stop has been input or each controller 22 to 25 informs the master controller 11 that a defect is occurring. Then, after the current cycle has been finished, the master controller 11 temporarily stops the operation by preventing start of the subsequent cycle. Specifically, after food material (3) is loaded, the temporary stop state is initiated without executing the transmission of data (1) or the transfer operation (2). In the meantime, the screen of the MMI 10 shows that the operation is being temporarily stopped, and a waiting mode is being initiated. Instead of being suddenly stopped during operation, each mechanism is stopped so as to be able to resume the operation. Then, when a temporary stop cancel icon or button displayed on the screen of the MMI 10 is touched, the master controller 11 is informed of this matter by the MMI 10 to resume the cycle from the transmission of data (1) that was being executed prior to the temporary stop.

Figure 3:
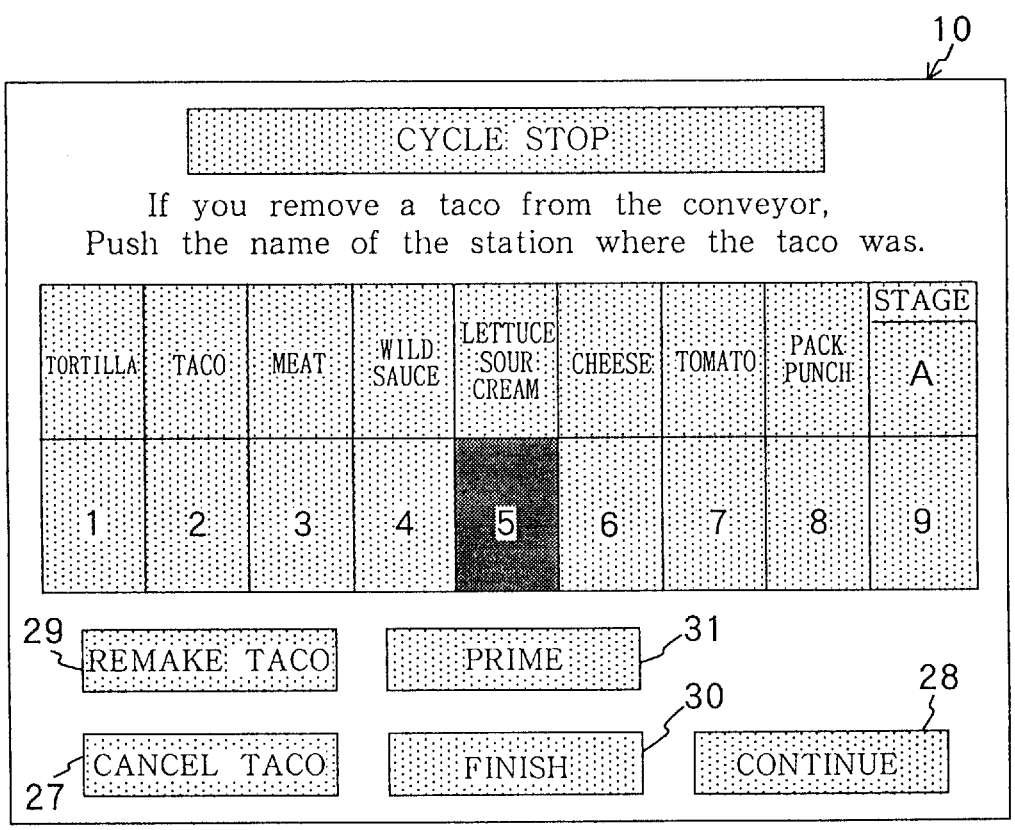
FIG. 3 shows a temporary stop screen of a man-machine interface in the controller in FIG. 2.

FIG. 3 shows a screen of the MMI 10 showing that a temporary stop is being executed. In the upper row in the middle of the screen, the food material loading positions are displayed as TORTILLA; TACO (taco shell); MEAT; WILD SAUCE; LETTUCE, SOUR CREAM (these are loaded at the same position); CHEESE; and TOMATO, and the packing position is displayed as PACK, PUNCH (the packing mechanism 17 seals the packing paper while punching a hole therein for distinguishing soft tacos from hard tacos). The row below the display of the loading positions indicates food item code currently located at that position. The upper and lower rows labeled STAGE indicate food items located at the sorting mechanism 21 and the lifting mechanism 20.

In the upper part of FIG. 3, hexadecimal values from 1 to A are specified for the item display section. These values are locational data indicating particular positions, and when the automatic cooking machine enters the temporary stop state, the master controller 11 transmits locational data 1 to A to the MMI 10 in the order of the preparing process together with the corresponding item code data of the taco located at the position, as described in FIG. 4. The MMI 10 actually converts the item code data into characters to show the food item located at, for example, the meat loading position, as in "soft, no tomatoes". When item code data have a value of zero, there is no taco located at that position. This provides a list of food items present at the respective positions during a temporary stop. If the sensor detects a defect to automatically carry out a temporary stop, the master controller 11 transmits to the MMI 10 data indicating the position at which the defect is occurring, and the MMI 10 highlights that position on the temporary stop screen by, for example, changing its tone or brightness as shown in the lettuce and sour cream loading position in FIG. 3. This enables the operator to quickly recognize the food material loading position at which the defect is occurring.

During the temporary stop, in order to remove the food item from the food material loading position at which the defect is occurring, the display of the food is touched on the screen in FIG. 3, and the CANCEL TACO icon is touched. This causes the MMI 10 to clear the display of the selected food. When a CONTINUE (temporary stop cancel) icon 28 is then touched, the MMI 10 transmits to the master controller 11 the locational data and the corresponding item code data which are displayed on the screen. In this case, the item code data on the food that has been cleared by the above cancel operation is zero. Thus, when a defective food lacking some food material is removed, the cooking data on the food can be simultaneously deleted. If no food has been removed, the MMI 10 sends back data received from the master controller 11 at the time of initiation of the temporary stop. On receiving data from the MMI 10, the master controller 11 transmits data described in (1) to each controller to resume the food preparing operation.

If a food has been removed during the temporary stop and is to be prepared again, the display of the food is touched, and a REMAKE TACO icon 29 is then touched. This causes the MMI 10 to clear the display of the selected food and to transmit the item code data on it to the master controller 11, as in the food to be newly prepared. When the CONTINUE icon 28 is then touched, the master controller 11 resumes the food preparing operation as in the removal of the food described above, and the food to be made again are prepared using the food materials which have been already input. In FIG. 3, when the FINISH icon 30 is touched during a temporary stop due to shortage of the food materials, only remaining foods are used to finish the lot. A PRIME icon only switches the MMI 10 to a test screen, and has no function related to this invention.

As described above, the invention allows the automatic cooking machine to freely execute temporary stop and resumption. Thus, if a food material becomes shortage during a preparing operation, the machine can be temporarily stopped to correct the defect by supplementing the food material. In addition, the defective material can be corrected flexibly through supplement to improve the operation rate of the automatic cooking machine and to prevent preparation of waste foods. In this case, manual defect monitoring operation is eliminated through usage of sensors to detect defects in order to automatically execute a temporary stop.

If the machine has means during temporary stop for displaying item data for food materials stopped at the respective food loading positions, the food located at this position can be listed to enable easy preparation for the manufacturing operation. In this case, if the machine also has means during temporary stop to highlight the display of the food material at the food material loading position in which a defect is occurring, the operator can quickly recognize the food material loading position in which a defect is occurring and take appropriate action.

If the machine has means to instruct the suspension of the preparation of the displayed food, data can be processed easily after the defective food has been removed. In this case, if the machine also has means to instruct the resumption of preparation of the stopped food, the removed food can be appropriately rearranged for preparation.

What is claimed is:

1. An automatic cooking machine comprising:
    a plurality of housing and loading mechanisms for various food materials situated at food material loading positions with a predetermined interval,
    a transfer mechanism for transferring a food material in the food material loading positions, a complete food being prepared by repeating preparation cycles, each preparation cycle having one transfer of the food material by the transfer mechanism from one to subsequent food material transfer positions and one supply of one food material at one of the housing and loading mechanisms, and
    a controller electrically connected to the housing and loading mechanisms and the transfer mechanism, said controller including temporary stop input means for temporarily stopping food preparing operations; temporary stop means electrically connected to the temporary stop input means for inputting a temporary stop instruction from the temporary stop input means to the housing and loading mechanisms and the transfer mechanism to temporarily stop the food preparing operations after one of the preparation cycles in force has been finished; resumption input means for inputting an instruction to resume temporarily stopped food preparation cycles; and temporary stop cancellation means electrically connected to the resumption input means for inputting a resumption instruction to the housing and loading mechanisms and the transfer mechanism to resume the preparation cycles subsequent to the preparation cycle which was completed at the time of receiving the temporary stop instruction.

2. A controller for an automatic cooking machine according to claim 1, further comprising at least one sensor for detecting a defect requiring a temporary stop of the machine, output of the at least one sensor actuating the temporary stop means.

3. A controller for an automatic cooking machine according to claim 2, further comprising means for displaying item data for foods stopped at the respective food material loading positions during the temporary stop.

4. A controller for an automatic cooking machine according to claim 3, further comprising means, which is operable during the temporary stop, for highlighting the item data for foods in one of food transfer positions at which the defect is occurring.

5. A controller for an automatic cooking machine according to claim 4, further comprising means for instructing suspension of the food material in which the defect is occurring.

6. A controller for an automatic cooking machine according to claim 5, further comprising means for instructing resumption of preparation of the food material which was suspended.

7. A controller for an automatic cooking machine according to claim 2, wherein said housing and loading mechanisms for various food materials include sensors for detecting shortage of the food materials.

* * * * *